United States Patent
Herrin et al.

(10) Patent No.: US 8,681,965 B1
(45) Date of Patent: Mar. 25, 2014

(54) SYSTEMS AND METHODS FOR AUTHENTICATING INTERACTIVE VOICE RESPONSE SYSTEMS TO CALLERS

(75) Inventors: Kris Herrin, Murphy, TX (US); Ron Hudson, Newark, DE (US)

(73) Assignee: Intervoice Limited Partnership, Las Vegas, NV (US)

( * ) Notice: Subject to any disclaimer, the term of this patent is extended or adjusted under 35 U.S.C. 154(b) by 1561 days.

(21) Appl. No.: 12/109,803

(22) Filed: Apr. 25, 2008

(51) Int. Cl.
*H04M 3/42* (2006.01)

(52) U.S. Cl.
USPC .............................. 379/207.13; 379/207.01

(58) Field of Classification Search
USPC .................. 379/207.01, 207.13, 88.03–88.24
See application file for complete search history.

(56) References Cited

U.S. PATENT DOCUMENTS

| | | | |
|---|---|---|---|
| 5,189,700 A * | 2/1993 | Blandford ..................... | 713/178 |
| 5,243,643 A | 9/1993 | Sattar et al. | |
| 5,797,124 A | 8/1998 | Walsh et al. | |
| 5,901,209 A | 5/1999 | Tannenbaum et al. | |
| 6,049,602 A * | 4/2000 | Foladare et al. ......... | 379/265.04 |
| 6,178,404 B1 | 1/2001 | Hambleton et al. | |
| 6,188,751 B1 | 2/2001 | Scherer | |
| 6,542,583 B1 * | 4/2003 | Taylor ........................ | 379/88.02 |
| 6,975,708 B1 | 12/2005 | Scherer | |
| 7,209,903 B1 | 4/2007 | Mamdani et al. | |
| 7,386,101 B2 | 6/2008 | Pugliese | |
| 7,694,138 B2 * | 4/2010 | O'Gorman et al. ........... | 713/168 |
| 7,698,566 B1 | 4/2010 | Stone | |
| 8,014,505 B2 | 9/2011 | Lee et al. | |
| 2002/0146668 A1 | 10/2002 | Burgin et al. | |
| 2002/0194096 A1 * | 12/2002 | Falcone et al. .................. | 705/35 |
| 2004/0064351 A1 * | 4/2004 | Mikurak .......................... | 705/7 |
| 2006/0004655 A1 * | 1/2006 | Alexander et al. .............. | 705/39 |
| 2007/0037552 A1 * | 2/2007 | Lee et al. ...................... | 455/410 |
| 2007/0044023 A1 | 2/2007 | Carter et al. | |
| 2007/0044026 A1 | 2/2007 | Potter et al. | |
| 2007/0173266 A1 * | 7/2007 | Barnes ........................ | 455/456.1 |
| 2007/0192618 A1 * | 8/2007 | Ellmore ........................ | 713/183 |
| 2007/0280456 A1 * | 12/2007 | Vadlakonda et al. ..... | 379/201.01 |
| 2008/0133761 A1 * | 6/2008 | Polk ............................. | 709/228 |
| 2008/0240406 A1 | 10/2008 | Akula et al. | |
| 2009/0106134 A1 * | 4/2009 | Royyuru ......................... | 705/35 |
| 2009/0254970 A1 * | 10/2009 | Agarwal et al. .................... | 726/1 |
| 2010/0063895 A1 * | 3/2010 | Dominguez et al. ............ | 705/26 |
| 2010/0269162 A1 * | 10/2010 | Bravo et al. ........................ | 726/6 |

OTHER PUBLICATIONS

U.S. Appl. No. 11/686,812, filed Mar. 15, 2007, Irwin et al.

* cited by examiner

*Primary Examiner* — William Deane, Jr.
(74) *Attorney, Agent, or Firm* — Crowe & Dunlevy

(57) ABSTRACT

By incorporating into the voice prompt response at least one item of private information, the caller knows that the IVR system providing the response is controlled by the trusted institution. Thus, when the caller does not hear the expected response, the caller is alerted to the fact that someone is masquerading as the trustworthy entity and the caller can then refuse to provide the desired information.

20 Claims, 2 Drawing Sheets

SYSTEMS AND METHODS FOR AUTHENTICATING INTERACTIVE VOICE RESPONSE SYSTEMS TO CALLERS

TECHNICAL FIELD

This disclosure relates to Interactive Voice Response (IVR) systems and more particularly to systems and methods for authentication of IVR systems to callers.

BACKGROUND OF THE INVENTION

It is now common practice for individuals to obtain financial information from financial institutions using IVR systems. Such systems allow a caller to obtain account balances, last payments, credit lines, etc. simply by calling a phone number, listening to a series of voice prompts that would instruct the caller to enter an account number, followed by a prompt for a PIN. When IVR systems were first introduced the caller would use the key pad on a telephone to enter the desired information. Advances in the Internet now allow users to use data services such as voice (speech) over the Internet (VoIP) systems, to access user's information. Thus it is not uncommon now for a user to obtain financial, medical and other private information over the Internet.

Phishing, and other fraudulent activities on the Internet, allow attackers to set up false systems that emulate an institution's IVR system. By doing so, an attacker can obtain customer's private log-on information (such as user account, name, social security number, PIN, etc.) thereby allowing the attacker to fraudulently obtain private information and even to conduct financial transactions such as withdrawals and transfers of cash from a target's account. Phishing works because the fraudulent attacker masquerades as a trustworthy entity in an electronic communication and the user, believing he/she is dealing with a known institution, provides the sensitive information.

In some situations, some institutions, using web based technology, will provide a distinctive pre-identified logo or icon to the accessing computer user. This icon is typically provided to the user so that the user will know that the user is accessing the known and correct institution. Thus, absence of this pre-identified icon indicates to the user that something is wrong and they may be communicating with a fraudulent attacker. While such technology reduces phishing for web based communication, it does not protect IVR systems.

BRIEF SUMMARY OF THE INVENTION

By incorporating into the voice prompt response at least one item of private information, the caller knows that the IVR system providing the response is controlled by the trusted institution. Thus, when the caller does not hear the expected response, the caller is alerted to the fact that someone is masquerading as the trustworthy entity and the caller can then refuse to provide the desired information.

In one embodiment, connections to a called party are routed to an IVR system which then inserts voice prompts on each connection. The voice prompts request data pertaining to the called party specific to the calling user. During the prompt sequence a voice prompt is sent to the calling user calculated to allow the calling user to verify that a connection has been established to the proper called party.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
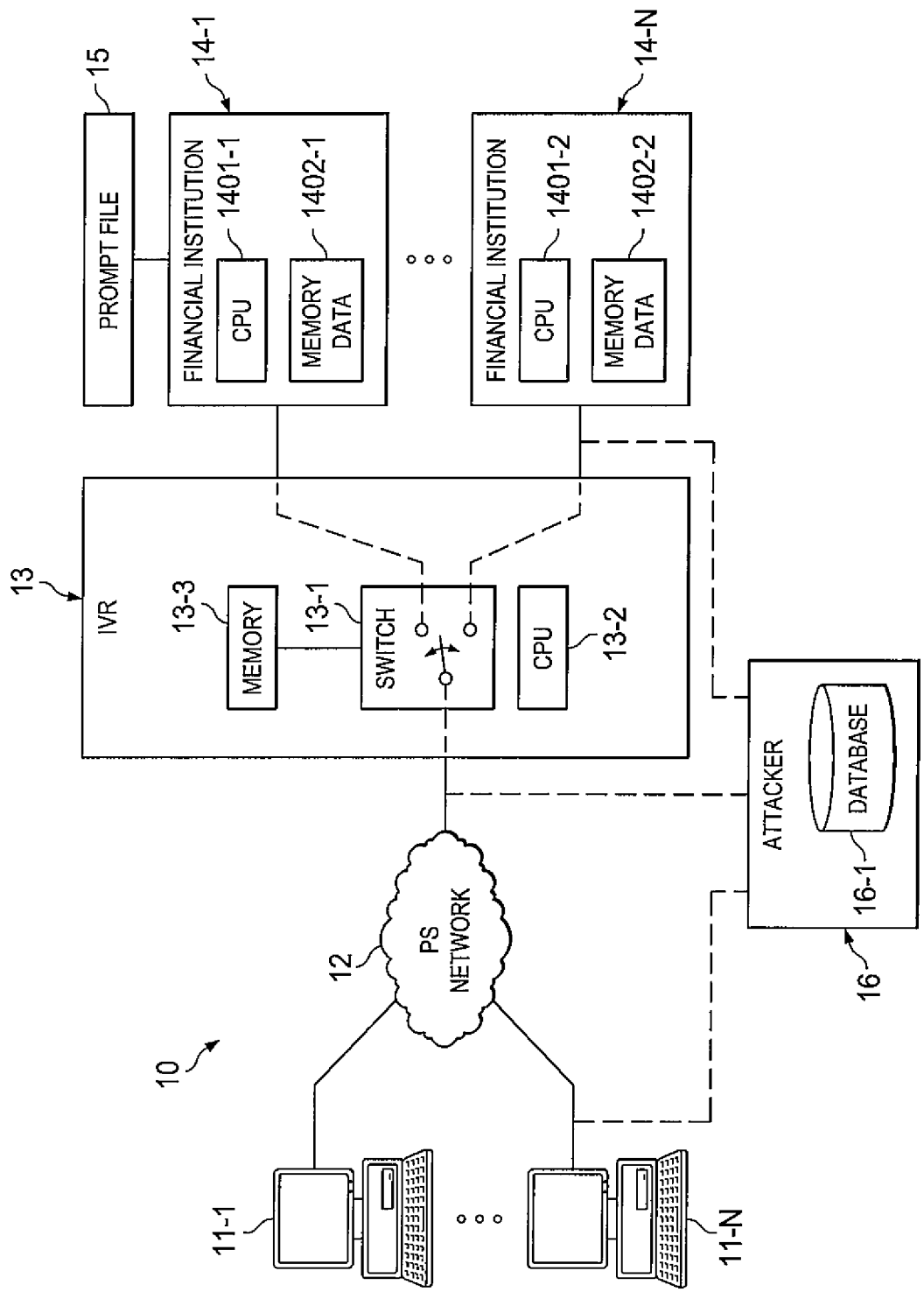
FIG. 1 illustrates one embodiment of an IVR system in which the inventive concepts can be employed.

FIG. 1 illustrates one embodiment 10 of an IVR system in which the inventive concepts can be employed. As shown in the embodiment, a plurality of user stations 11-1 to 11-N connect via public switched network 12 to IVR 12. User stations 11-1 to 11-N are shown as wire-line computer terminals but these can be any number of different devices, such as VoIP telephones, wireless terminals, cell phones and the like. Any device that can send and receive voice communications can be advantageously used. The switched network could, for example, be the Internet or any other data transport network desired. Also, in some situations it might be advantageous to have a terminal, such as a cell phone, interact directly with IVR 13, or with a switch placed in front of the IVR.

IVR 13 is in communication with one or more financial institutions 14-1 to 14-N. Each financial institution contains at least one CPU, such as CPU 1401-1, and data storage, such as data storage 1402-1. Note that typically a single IVR only processes information to and from a single institution, but that institution may have multiple branches or multiple data storage devices as shown. A typical IVR receives incoming connections from calling users who have dialed a specific number or entered a specific Internet address pertaining to a called party. For purposes of this discussion, the called party is a financial institution, but the called party can be anyone having information that users require.

When a calling connection is directed to institution 14-1 it is actually routed to IVR 13. Switch 13-1, working in conjunction with prompt controller CPU 13-2 and memory 13-3 in IVR 13, provides prompts to the calling user to request specific information. For example, IVR 13 would send a voice message to the calling user requesting an account number. The user would then enter the account number and the IVR would then request additional information, such as a PIN.

When this information is collected from the calling user it is passed along to the proper financial institution for validation by the institution's system, for example, by CPU 14-1 operating in conjunction with memory and data from database 1402-1. Note that in some cases several prompts may be provided by the IVR before accessing the financial institution's system, or each prompt can be passed along. This is a design choice of the system.

When system 14-1 is satisfied that it has identified an account and that the calling user is authorized to obtain information from that account, the requested information, as obtained by a series of IVR controlled prompts, is passed along to the user. In some situations the financial institution is requested to perform a service or to take some action. For example, the calling user might respond to a prompt by replying, "Please transfer $5,000 to account XYZ." If the calling user is otherwise qualified to make such a request and the funds are available, the transfer is made.

Now let us turn our attention to fraudulent activity. Attacker 16 could fraudulently make a connection to a terminal device, such as to terminal device 11-1 by gaining access at multiple locations as shown by the dotted lines. In some situations, the attacker would simply use an Internet connection to send a message to terminal 11-1 requesting information. These are examples of attackers affirmatively looking for a target.

Another method for obtaining user identification data is for the attacker to fraudulently route a calling connection to the attacker's "substitute" system. Thus, when user 11-1 places a connection through network 12 to financial institution 14-1 instead of that connection being routed to IVR 13, it is intercepted by the attacker and routed to system 16 instead. In such a situation, system 16 would appear to the calling user as though the calling user had gained access to financial institution 14-1 via IVR 13. The calling user would hear, for example, a voice prompt such as, "Hello, this is ZZ bank would you please provide your account number." The attacker would mimic the bank's normal greeting and prompt sequence so that the calling user would not have a hint that he/she is actually about to divulge sensitive information to a thief.

The caller, thinking he/she is communicating with the financial institution, would speak or type his/her account number. After the account number is entered (and stored in data base 16-1) the attacker's IVR would then prompt, for example, "Now please enter your PIN." The calling user would then innocently enter his/her PIN. The attacker's system could continue to solicit information from the calling user if it so desired. The attacker's database at that point would contain all of the information that the fraudulent attacker requires in order to defraud the user and/or the financial institution.

The false IVR system of the attacker then terminates the connection since it does not have access to the desired data. This is accomplished by either dropping the connection or by a prompt, such as, "We are experiencing technical difficulties at this time. Please try back later. We are sorry for the inconvenience." All very friendly and very official sounding. And very wrong!

In order to prevent the scenario just described from occurring, the IVR and/or the financial institution can add a prompt file, such as prompt file 15, which contains information specific to each potential calling user. While the prompt file is shown external to the financial institution, it can be a part of the internal database if desired. In fact, there can be more than one prompt file and the actual prompt (as will be discussed) can actually come from data maintained in the normal course of business, thus eliminating the need for a separate prompt file. Discussions herein pertaining to the prompt file are to be understood to extend to any system or method for generating or retrieving user specific prompts. The operation of the prompt file will be described with respect to FIG. 2.

Figure 2:
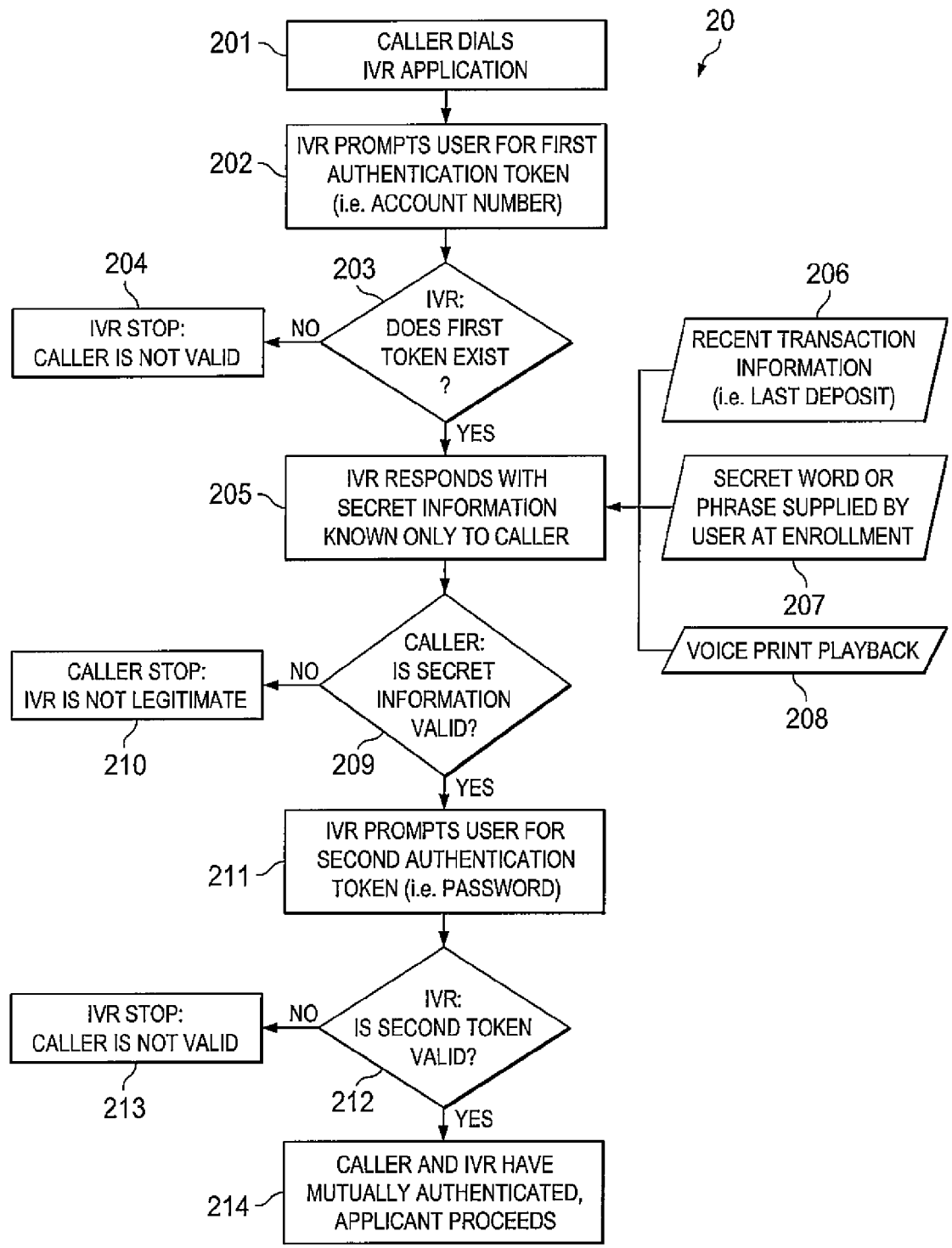
FIG. 2 shows one embodiment of a method for operation of the concepts discussed herein in an IVR system.

FIG. 2 shows one embodiment of a method, such as method 20, for operation of the concepts discussed herein in an IVR system. Process 201 controls the routing of a calling connection from a calling user to the IVR. Process 202 prompts the calling user for the first authentication token such as "What is your account number?" It is possible at this stage in the connection progress for the IVR to inform the calling user that a specific validation prompt will be forthcoming during the prompt sequence. While such an alerting prompt will, of course, not be provided by an attacker's IVR, nonetheless over time, the calling user will come to know that such prompts are to be expected and thus when such a prompt is not forthcoming the calling user will know to terminate the connection.

Upon receipt of the response from the calling user the IVR determines, often in conjunction with the called institution, if the first authentication token (user identity, account, etc.) exists. If not, the call session is ended. If the first token is valid then process 205, working in conjunction with the prompt data base, determines an appropriate response which could be, for example, a voice message (or a screen message) selected from one or more categories that the calling user would immediately recognize. Thus, process 206 could supply a last transaction amount, process 207 could supply a secret word agreed upon at an earlier time, or process 208 could supply a voice print playback of the user's voice from a previous session. The nature of the voice-back prompt would be such that an intercept attacker would not have access to the information and thus would not be able to easily duplicate. This secret prompt information serves as a destination validation to the calling user that indeed the connection has been made to a valid destination.

Process 209 then asks the calling user if the "secret" information is correct. This then allows the user to affirmatively respond. If the response is negative, then the calling session is ended. Note that process 209 is one that is performed by the calling user, in that if the calling user does not receive the proper destination validation verbal reply, then the user terminates the call and does not supply any further information. Process 209 is not one which necessarily will require a prompt from the IVR to the calling user.

Note also that the destination validation prompt could change in a manner known by the calling user but not by a potential attacker. Also, the destination valuation could be provided based upon some criteria other than a specific account. For example, a voice print of the caller could be identified or the calling address could be used to provide the validation prompt. Thus, the lack of a "Hello, Miss. Z," could alert calling user Z that perhaps she is not communicating with an authentic IVR.

Note that the verification voice prompt is provided after a first token of user specific data has been obtained but before the user is required to provide a full set of information that would allow a fraudulent attacker to hack into the user's accounts. Certainly more than one identification token can pass between the calling user and the IVR but prior to a full identification being made available the verification voice prompt will occur.

Returning to FIG. 2, assuming the user has not terminated the connection, the IVR then performs its normal functions as shown in processes 211, 212, 213 and 214 so that the IVR and the user have mutually authenticated each other. Certainly, if desired, a second piece of "secret" data could be returned to the user to allow the calling user to double check the authenticity of the IVR/financial institution. This second check could be made, for example, when a service, such as a cash transfer has been authorized. Calling users could be put on notice that unless they hear the proper destination validation when they make certain transactions or inquiries, they should immediately terminate the connection and notify the called party.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein, may be utilized according to the present invention. Accordingly, the appended claims are intended to include, within their scope, such processes, machines, manufacture, compositions of matter, means, methods, or steps.

What is claimed is:

1. A system for providing interactive voice response (IVR) to a user who has established an interactive communication connection with a trusted called party; said system comprising:
    a prompt controller operative for providing voice prompts to the user, said voice prompts comprising an initial identification prompt soliciting data from said user, said solicited data identifying said user to said trusted called party;
    said controller operative for, after the user has been identified providing the user a destination validation voice prompt, said destination validation voice prompt generated based upon said data solicited by the initial identification prompt and validating the trusted called party to the user;
    said controller further operative for, after the trusted called party has been validated, providing an identification completion prompt soliciting additional data from said user, said solicited additional data validating the user to the trusted called party.

2. The system of claim 1 wherein said destination validation voice prompt does not solicit data from said user.

3. The system of claim 2 wherein said destination validation voice prompt is selected from the list of: a last account transaction; and a voice print from a previous connection session.

4. The system of claim 2 wherein said controller is further operable for prompting said user to make a determination of validity of said destination validation prompt after said destination validation prompt has been provided.

5. A method for operating an IVR comprising:
    routing to an IVR system connections from calling users to a specific institution;
    inserting voice prompts by said IVR system on each routed connection, said voice prompts comprising a sequence of user validation voice prompts requesting user specific data from a calling user, said user specific data pertaining to said specific institution and allowing said specific institution to validate the calling user; and
    during the sequence of user validation voice prompts, inserting a destination validation voice prompt calculated to allow the calling user to verify that a connection has been established to an IVR properly associated with said specific institution.

6. The method of claim 5 wherein said inserted destination validation voice prompt is selected from the list of: a last account transaction; and a voice print from a previous connection session.

7. The method of claim 5 further comprising:
    providing said inserted destination validation voice prompt to said IVR from said specific institution.

8. The method of claim 5 wherein said inserted destination validation voice prompt follows a notification prompt informing said calling user to expect said destination validation voice prompt.

9. The method of claim 5 wherein the destination validation voice prompt does not solicit data from the calling user.

10. A system providing IVR services to a user calling an institution, comprising a processor and a memory, the memory being encoded with an application program comprising instructions executable by the processor, said program comprising:
    code for prompting a calling user to provide a first identity token;
    code for verifying that a provided first identity token is valid; and
    code for providing a verification voice prompt to said calling user, said verification voice prompt containing information particular to said calling user and to said called institution sufficient for allowing said calling user to verify that said calling user is communicating with an institution called by said calling user;
    wherein said verification prompt occurs after initial identification of said calling user but prior to said calling user being asked for information usable in completing said identification.

11. The system of claim 10, the program further comprising:
    a code for controlling an exchange of information provided by said calling user with calling user specific data controlled by said called institution.

12. The system of claim 11, the program further comprising:
    code for controlling a termination of a calling connection when said calling user is unable to verify an authenticity of said called institution.

13. The system of claim 11, the program further comprising:
    a code for controlling a notification prompt to said calling user indicating that a subsequent prompt will contain user specific information, said notification prompt occurring prior to receipt of identification data provided by said calling user.

14. The system of claim 10, wherein the verification voice prompt does not solicit a response from the calling user.

15. A system for providing verification to a user calling an institution; said system comprising:
    means for prompting a calling user to provide a first identity token;
    means for verifying that a provided first identity token is valid;
    means for providing a verification voice prompt to said calling user, said voice prompt containing information particular to said calling user and to said called institution sufficient for allowing said calling user to verify that said calling user is communicating with an institution called by said calling user; and means for controlling an exchange of information provided by said calling user with calling user specific data controlled by said called institution.

16. The system of claim 15 further comprising:

means for controlling a termination of a calling connection when said calling user is unable to verify an authenticity of said called institution.

17. The system of claim 15 further comprising:

means for controlling a verification prompt to said calling user indicating that a subsequent prompt will contain user specific information, said verification prompt occurring prior to receipt of identification data provided by said calling user.

18. The system of claim 15 wherein said verification prompt occurs after initial identification of said calling user but prior to a time when said calling user completes said identification.

19. The system of claim 2, wherein said destination validation voice prompt is taken from information maintained by the trusted called party in the normal course of business.

20. The system of claim 10, the program further comprising a code for prompting the calling user to provide a second identity token after verification that the provided first identity token is valid and provision of the verification voice prompt to the calling user.

* * * * *